United States Patent [19]
Louie

[11] 3,938,087
[45] Feb. 10, 1976

[54] HIGH SPEED BINARY COMPARATOR

[75] Inventor: Ming H. Louie, Norristown, Pa.

[73] Assignee: Honeywell Information Systems, Inc., Waltham, Mass.

[22] Filed: May 31, 1974

[21] Appl. No.: 475,089

[52] U.S. Cl.............................. 340/146.2; 235/177
[51] Int. Cl.².......................................... G06F 7/02
[58] Field of Search.................... 340/146.2; 235/177

[56] References Cited
UNITED STATES PATENTS

| | | |
|---|---|---|
| 3,091,392 | 5/1963 | Arya .................................. 340/146.2 |
| 3,241,114 | 3/1966 | Zieper et al. ...................... 340/146.2 |
| 3,320,587 | 5/1967 | Becker.............................. 340/146.2 |
| 3,390,378 | 6/1968 | Dryden ............................. 340/146.2 |
| 3,660,823 | 5/1972 | Recks ................................ 340/146.2 |

Primary Examiner—Malcolm A. Morrison
Assistant Examiner—Errol A. Krass
Attorney, Agent, or Firm—R. T. Reiling; D. A. Frank

[57] ABSTRACT

A comparator circuit compares the relative magnitudes of two binary numbers. Each of the binary numbers is fed in parallel through a plurality of two-bit comparator modules corresponding to the number of two-bit pairs in the largest binary number. The binary numbers are compared order by order and simultaneously to determine one or more of five relationships between the numbers. For binary numbers greater than two bits in length, the two-bit comparator module is utilized as the basic building block and an additional level of logic circuitry is required in order to obtain an output identifying one of the relationships. Since the two-bit modules may be used interchangeably and since the relative magnitude of any two-bit grouping is generated simultaneously, the comparator circuit provides for a fast and efficient identification of relationships between two binary numbers.

23 Claims, 7 Drawing Figures

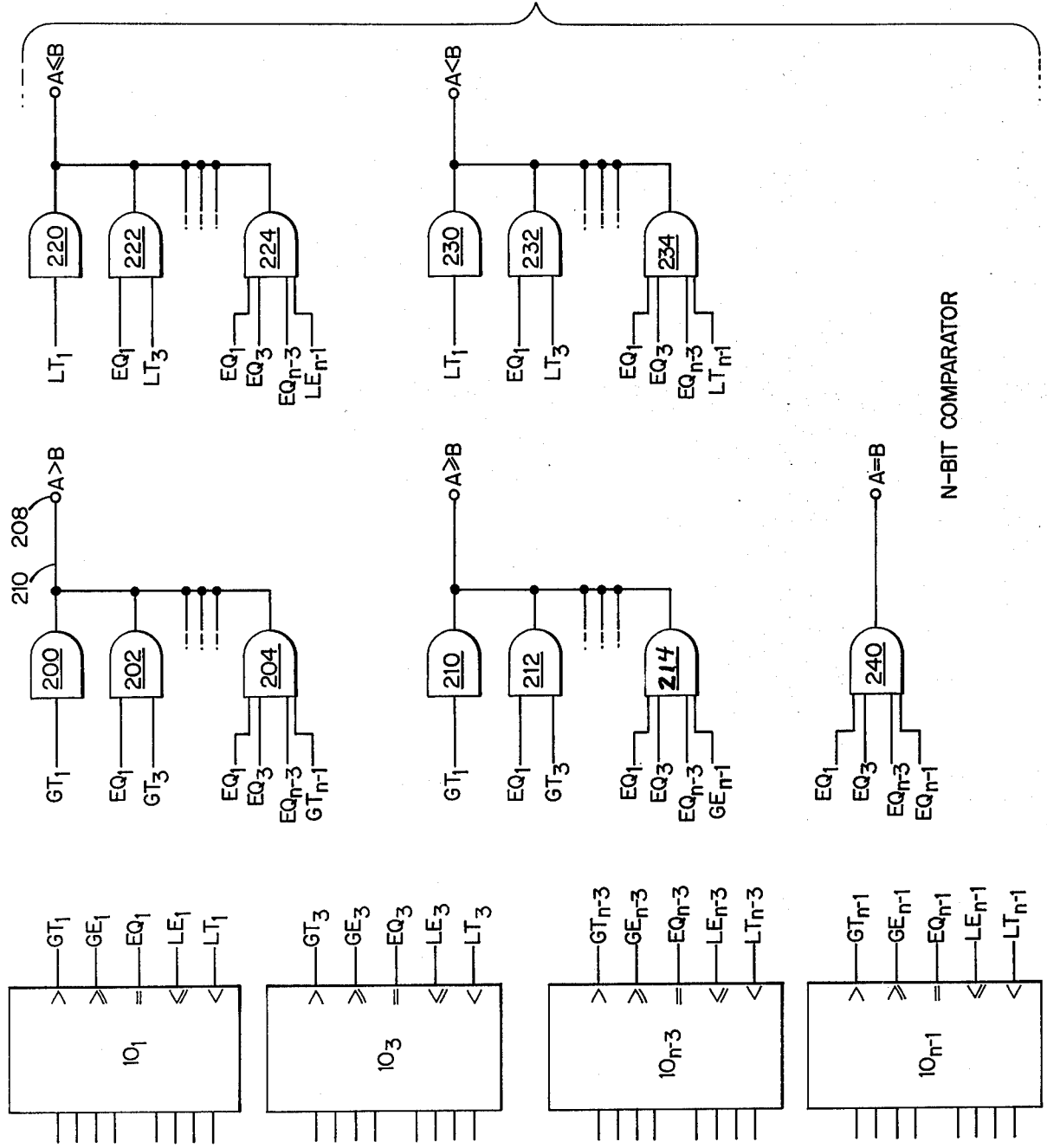

HIGH SPEED BINARY COMPARATOR

BACKGROUND OF THE INVENTION

1. Field of the Invention

This invention relates to an apparatus for comparing two numbers and more particularly to a high speed binary parallel digital comparator for determining one of five relationships between two binary numbers.

2. Description of the Prior Art

In data processing systems, it is frequently necessary to ascertain the relationship between two numbers in order for a given sequence of operations to occur. Thus, in most digital or data processing systems, a given data word A of n number of bits is required to be compared with another data word B of m number of bits. On the basis of their relative magnitudes, i.e. A is greater than B, A is greater than or equal to B, A equals B, A is less than or equal B, A is less than B, the operating sequence may stop, continue, or branch to another sequence. Thus, for example, in data processing systems securing data, it is usual to compare the ring number (security code number) of the presently operating job with the ring number identifying the importance of data to be utilized. If the ring number of the job is greater than the ring number of the data, the job will be halted such that the data being addressed is not allowed to be utilized. Conversely, however, if the ring number of a job is less than or equal to the ring number of the data, the operations of a job may be performed.

In the past, the methods for comparing two binary digital numbers in parallel have been slow and inefficient. Moreover, the common methods used for implementing comparators were not modular and generally introduced longer propogation delays, higher costs, and increased complexity (more logic gate connections).

Most often, the comparison has been done by subtracting one binary number from another number digit by digit with the results being observed and an indication given as to the determination of the results. This method employs complicated and extensive circuitry requiring excessive components. The number of "AND" or "OR" gates required becomes prohibitively large for larger numbers having numerous digits therein. Additionally, limitations and speed of response resulting from inherent limitations in the complicated circuitry present another serious source of difficulty in such methods. Moreover, for some instances, the subtraction method may not be fast enough to meet the desired speed necessary for performing the operations. This is because the carry/borrow signals have to go through many levels of logic (even with carry/look-ahead schemes) before the results become stable.

The apparatus of this invention provides simple and efficient means having a fast response time for comparing two binary numbers. New and novel circuitry including fewer elements than heretofore provided produces output signals indicating one of five relationships between the two binary numbers. Moreover, the design suggested herein uses a modular approach for constructing the comparator. A basic unit is a two-bit comparator which derives the relative magnitudes of the two binary numbers each consisting of two bits. The basic units can be utilized as the building blocks to implement an N-bit comparator in a tree-type structure. Since the relative magnitudes of any two-bit group can be generated simultaneously, the speed is much faster than that of a regular subtractor. Furthermore, the realization of an N-bit comparator using this kind of building block approach is very simple and flexible.

OBJECTS OF THE INVENTION

It is a primary object of the present invention to provide an improved binary digital comparator.

It is a further object of the invention to provide a high speed binary parallel digital comparator which minimizes the number of logic levels and cost.

It is another object of the invention to provide a comparator circuit for determining one of five relationships between two binary numbers.

It is a further object of the invention to provide a modular two-bit comparator which is simple, flexible and fast.

It is yet another object of the invention to provide a two-bit comparator module which is shareable by like operands.

SUMMARY OF THE INVENTION

Briefly and in accordance with the above objects, the present invention is concerned with an apparatus for comparing two binary numbers. The two binary numbers are fed two bits by two bits into basic two-bit comparator modules and are compared order by order and simultaneously to provide a plurality of relationships between each pair of two-bits. In one embodiment of the two-bit comparator module, a minimum of electrical connections via logical AND gates is made to determine if A > B (i.e., the first two bits being compared is numerically greater than the second two bits), A < B, or A = B. Inverters are used to determine the derivative relationships A ≤ B and A ≥ B. In an alternative embodiment of the two-bit comparator module, the relationship A = B is also a derivative one, formed by combining signals denoting A > B and A < B by means of a NAND gate. In one embodiment of the generalized n-bit comparator, each of the five relationships is obtained by comparing like relationships from the member two-bit comparator modules. In an alternative embodiment of the n-bit comparator the relationships A ≥ B and A ≤ B are derived from other relationships by means of OR gates.

BRIEF DESCRIPTION OF THE DRAWINGS

These and other more detailed and specific objects and features will be disclosed and become apparent in the course of the following specification, reference being had to the accompanying drawings in which:

FIG. 5 is a logic diagram showing the preferred embodiment of an n-bit comparator;

DETAILED DESCRIPTION OF THE PREFERRED EMBODIMENT

Assume for purposes of explanation that one binary number is A and the other binary number is B. The operand A can be denoted as $A_1, A_2 \ldots A_n$ wherein $A_n$ is the least significant order (bit) of the data string and $A_1$ is the most significant order (bit) of the data string A. In like manner, B is also a data string of a given length and can be represented as $B_1, B_2 \ldots B_m$ wherein $B_m$ is the least significant bit and $B_1$ is the most significant bit.

Figure 1:
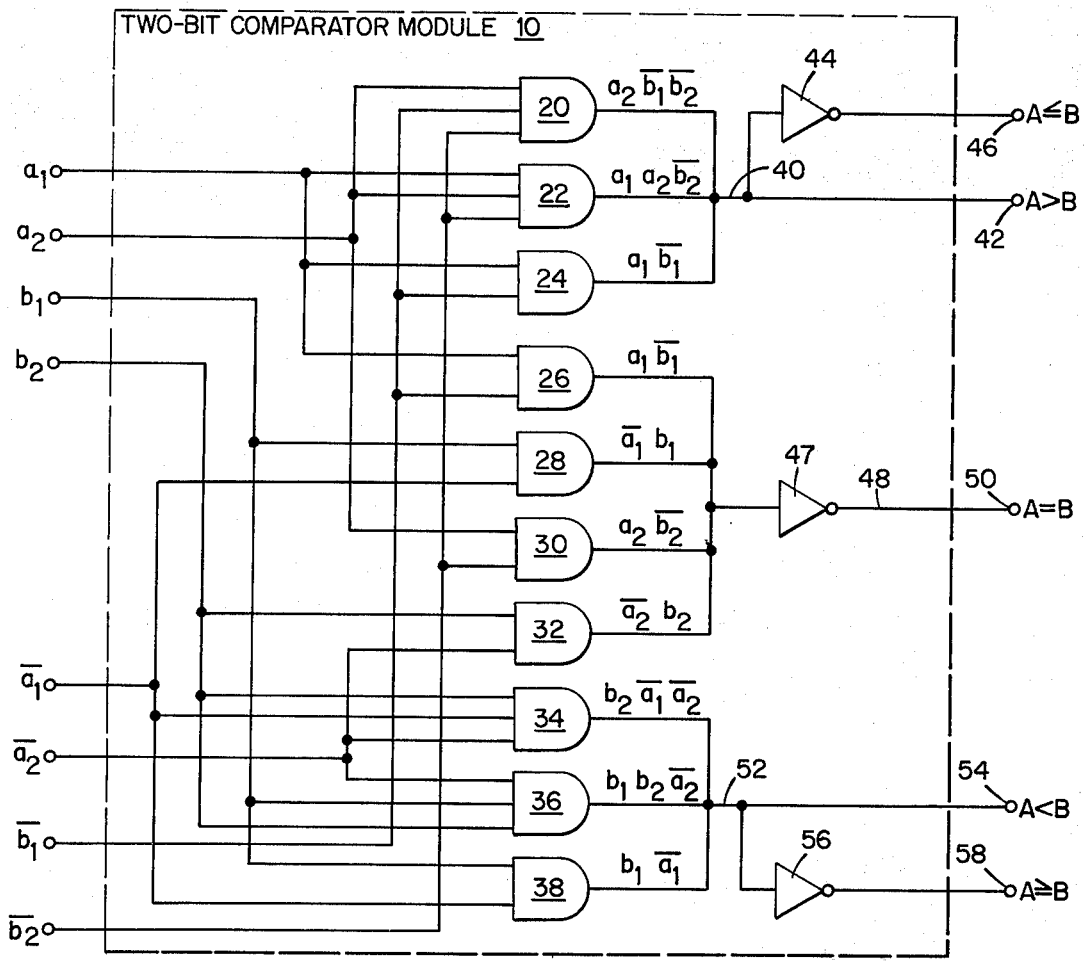
FIG. 1 is a logic diagram showing a preferred embodiment of a two-bit comparator module of the instant invention.

Referring now to FIG. 1, there is shown the circuitry of the invention in which the comparison of a pair of two-bit binary numbers is made. The basic two-bit comparator module 10 has eight inputs representing both the true and complement of each of the binary numbers. These inputs are derived from a register which in usual practice comprises a plurality of flip flops, the flip flops each having a true and complementing output. As a result, the inputs $A_1, A_2, \overline{A_1}$ and $\overline{A_2}$ identify all the possibilities for the A data operand. In like manner, the B data operand is identified by $B_1, B_2, \overline{B_1}$ and $\overline{B_2}$. These inputs are provided to a plurality of AND gates 20 to 38. For example, AND gate 20 is coupled to the inputs $A_2, \overline{B_1}$ and $\overline{B_2}$. In like manner AND gates 22 to 38 are coupled to selected inputs in order to provide a predetermined output.

If all the inputs to AND gates 20, 22 or 24 are true, i.e. provide a binary 1 signal, then that AND gate provides a true or positive output over conductor 40. Conductor 40 is essentially a wired OR gate which is responsive to any of the outputs from AND gates 20, 22 or 24. If a positive signal is generated to conductor 40, output terminal 42 contains a high signal which indicates the relationship that the A operand is greater than the B operand. Also coupled to conductor 40 is inverter 44. As is well known in the art, if conductor 40 does not transfer a positive signal, then inverter 44 provides a positive or true signal. This would be transferred to output terminal 46 indicating the relationship that A is less than or equal to the B operand. Inverter 44 does not provide a signal to output terminal 46 if conductor 40 is providing a signal to terminal 42.

Connected to the output of AND gates 26, 28, 30 and 32 are inverter 47 and conductor 48 which provide a signal to output terminal 50 if the A and B operands are equal. In like manner, connected to AND gates 34, 36 and 38 is conductor 52 which provides a signal to output terminal 54 if any of AND gates 34, 36 or 38 are enabled. Output terminal 54 indicates the relationship that the A operand is less than the B operand. Coupled to conductor 52 is inverter 56 which provides an output signal to output terminal 58 when there is no signal provided over conductor 52. Output terminal 58 indicates the relationship that the A operand is greater than or equal to the B operand.

In order to illustrate the operation of the two-bit comparator shown in FIG. 1, an example is given as follows. If the A operand is equal to 1, 0 and the B operand is equal to 0, 1, then $A_1 = 1, A_2 = 0, \overline{A_1} = 0, \overline{A_2} = 1, B_1 = 0, B_2 = 1, \overline{B_1} = 1$ and $\overline{B_2} = 0$. With these inputs, AND gates 26 and 32 are enabled thereby providing a signal to inverter 47 and as a result no signal appears over conductor 48 to output terminal 50. Also, AND gate 24 is enabled thereby providing a signal over conductor 40 to output terminal 42 indicating that the relationship exists wherein A is greater than B. Finally, none of the AND gates 34 to 38 are enabled and as a result no signal is provided over conductor 52 to output terminal 54. However, inverter 56 provides a positive signal in response to the absence of the signal over conductor 52 thereby enabling output terminal 58 indicating that A is greater than or equal to B.

As another example, let the A operand be such that $A_1 = 0$ and $A_2 = 1$ and the B operand be such that $B_1 = 1$ and $B_2 = 0$. Thus, $\overline{A_1} = 1, \overline{A_2} = 0, \overline{B_1} = 0$ and $\overline{B_2} = 1$. With these parameters, AND gates 28 and 30 are enabled thereby providing a signal to inverter 47 and an absence of the signal to output terminal 50 thereby indicating that A is not equal to B. In addition, AND gate 38 is enabled thereby providing a signal over conductor 52 to output terminal 54 thereby indicating that A is less than B. Since none of the AND gates 20 to 24 are enabled, inverter 44 in response to the absence of a signal over conductor 40 provides a signal to output terminal 46 thereby indicating the relationship that A is less than or equal to B.

Figure 2:
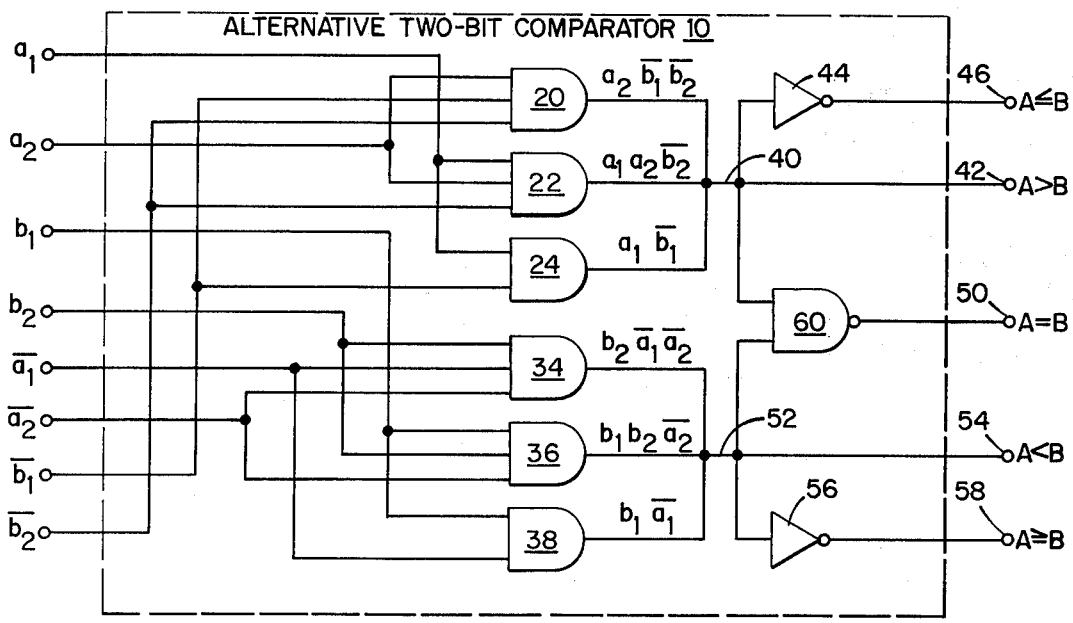
FIG. 2 is a logic diagram showing an alternative embodiment of a two-bit comparator module.

Referring next to FIG. 2, an alternative embodiment of the two-bit comparator module 10 of FIG. 1 is shown. In FIG. 2, AND gates 26 and 32 are omitted and in their place, NAND gate 60 is provided. NAND gate 60 provides another level of circuitry so that the fast response time provided in FIG. 1 is slightly diminished. However, the advantage is the utilization of four fewer AND gates in order to provide the same five relationships between the binary numbers. In order to explain the operation of FIG. 2, assume then that A operand equals 1, 1, and the B operand also equals 1, 1. As a result, the $A_1, A_2, B_1$ and $B_2$ inputs will all contain a positive signal whereas the complementing inputs, i.e. $\overline{A_1}, \overline{A_2}, \overline{B_1}$, and $\overline{B_2}$ inputs will all provide the absence of a signal, i.e. a binary ZERO. With these inputs, none of the AND gates 20, 22, 24, 34, 36 or 38 are enabled and as a result conductors 40 and 52, do not provide signals. Inverters 44 and 56 in response to the absence of the signals provide signals to output terminals 46 and 58 thereby indicating that A is less than or equal to B and A is greater than or equal to B. Obviously the logical analysis must be that A is equal to B. This is reiterated by NAND gate 60 which in response to the absence of two signals and the inversion thereof provides a signal to output terminal 50.

Each of the output terminals serves to trigger a response in the data processing system. Thus, for example, in the ring checking example given previously, if output terminal 50 had a signal, then the indicated operation for retrieving the information from the memory of the data processor would be allowed to occur. Conversely, if output terminal 54 or 42 had a signal, then the indicated operation would be inhibited, and as a result, no execution of the operation would occur. In addition, it is possible that more than one signal may be utilized by the data processing system. Thus, using the same example, the results of the output terminal 46 could enable the inhibiting of the instruction whereas the result on output terminal 54 could cause a branching operation to occur such that another sequence of operation would be enabled.

Figure 3:
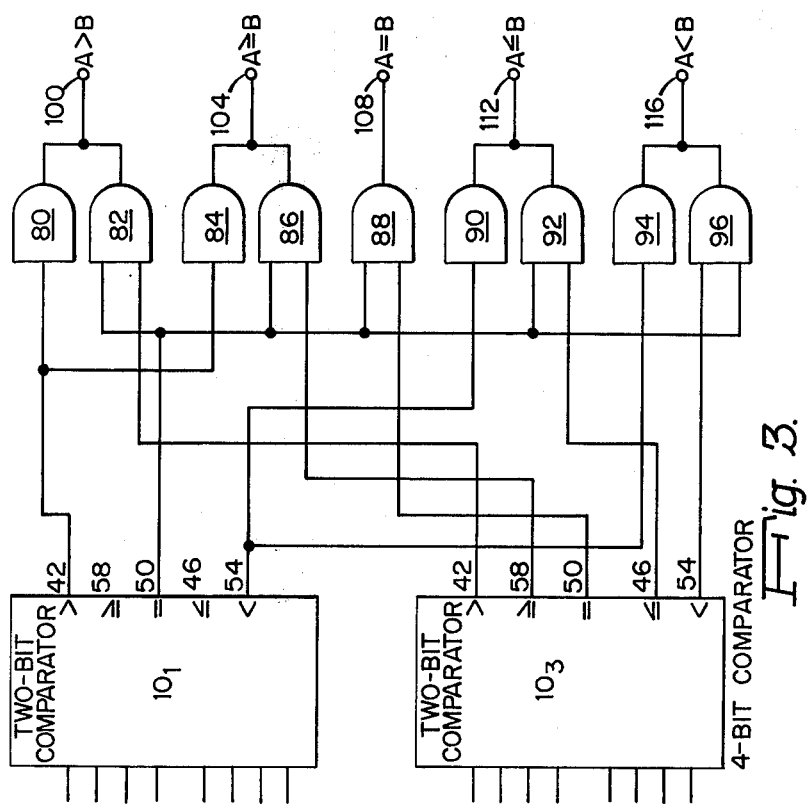
FIG. 3 is a logic diagram showing a preferred embodiment of a four-bit comparator.

Referring now to FIG. 3, a parallel four-bit binary comparator is shown. In order to provide the comparator circuit, the two-bit comparator circuits shown in FIGS. 1 and 2 are modularized thus providing greater reliability and making it easy to detect logic faults within the comparator. Moreover, by standardizing the circuitry, the added advantages of providing flexibility and shareability are also realized. These basic building blocks, as they will be subsequently called, are indicated by numerals 10. The operands now each have four designations, i.e. $A_1 \ldots A_4$ wherein $A_4$ is the least significant order (bit) and $A_1$ is the most significant order (bit). FIG. 3 illustrates that when more than two bits are being compared, another level of circuitry is required in order to realize the output of the binary comparators. While this additional level of circuitry slows down the response time, it is still considerably faster than the typical response time provided by a subtractor unit. Moreover, as will be subsequently shown in FIG. 5, the number of levels of circuitry are not increased as the number of orders of the larger binary number increases. The number of levels will be increased only when the number of wired OR gates exceeds the physical limit of wired OR capability of the type of circuit used.

The most significant orders (bits) of the binary number of delivered to basic building block $10_1$, and the least significant orders (bits) are delivered to basic building block $10_3$. The output signals were well defined in FIGS. 1 and 2, and there is no need to further amplify them herein. For the relationship A greater than B, two additional AND gates, 80 and 82, are utilized. AND gate 80 is connected to output terminal 42 of basic building block $10_1$, and AND gate 82 is connected to the output terminal 42 of basic building block $10_3$ and also to output terminal 50 of basic building block $10_1$. If A is greater than B, then either $A_1A_2$ is greater than $B_1B_2$ (in which case AND gate 80 will be enabled) or else $A_1A_2$ equals $B_1B_2$ but $A_3A_4$ is greater than $B_3B_4$ (in which case AND gate 82 will be enabled). In any event, a positive signal will be applied to terminal 100, indicating that A is greater than B. In like manner, the other relationships between the A operand and the B operand may be determined. Thus, AND gates 84 and 86 in FIG. 3 are responsive to the "greater than" output from basic building block $10_1$, to the "equal to" output of $10_1$, and to the "greater than or equal to" output of $10_3$. If A is greater than or equal to B then either $A_1A_2$ is greater than $B_1B_2$ (in which case AND gate 84 will be enabled) or else $A_1A_2$ is equal to $B_1B_2$ and $A_3A_4$ is greater than or equal to $B_3B_4$ (in which case AND gate 86 will be enabled. In either event, an output signal will be applied to terminal 104.

FIG. 3 illustrates the utilization of an additional level of circuitry in order to perform the comparison for the five relationships between the two binary numbers. As the orders of binary numbers increases, the number of AND gates required also increases; however, no additional levels of circuitry are necessary in order to obtain the output. Thus, the same fast and reliable output is able to be obtained utilizing the preferred embodiment shown in FIG. 3 and expanded to multiples of two.

Figure 4:
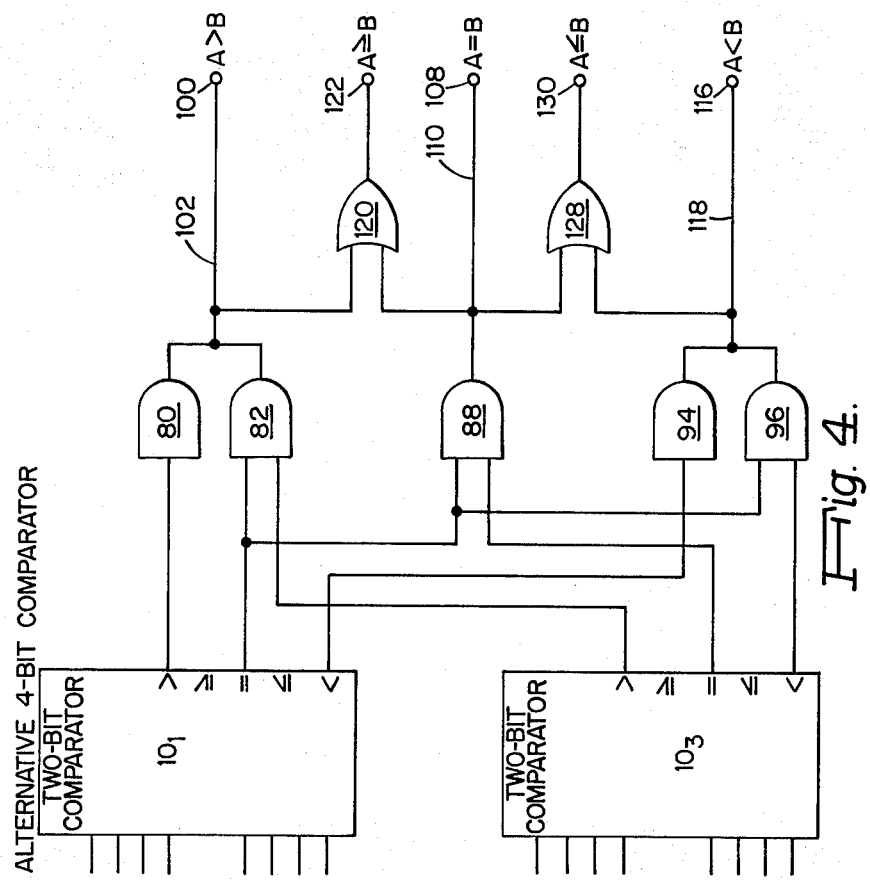
FIG. 4 is a logic diagram showing alternative embodiment of a four-bit comparator.

An alternative embodiment which adds an additional level of circuitry is shown in FIG. 4. Although the speed is depreciated, fewer overall components are required. In FIG. 4, the outputs from the "less than or equal to" or the "greater than or equal to" inputs are not utilized but are derived from a combination of the "greater than" or "less than" outputs in combination with the "equal to" outputs. Thus, for example, in order to obtain the relationship "A greater than or equal to B", either A is greater than B (enabling either AND gate 80 or AND gate 82, thus enabling OR gate 120) or else A is equal to B (enabling AND gate 88 and OR gate 120.

In either case, a positive signal reaches terminal 122. It is noted that OR gate 120 is responsive only after the previous level of AND gates, i.e. AND gates 80, 82, and 88 have been activated, thereby providing for a slower response time.

In like manner, the output for the relationship A less than or equal to B is similarly derived. Either A is less than B (enabling either AND gate 94 or AND gate 96, thus enabling OR gate 128) or A is equal to B (enabling AND gate 88 and OR gate 128). In either case, a positive signal reaches terminal 130.

FIG. 5 shows the implementation of the parallel comparator extended to the nth order. The basic building blocks $10_1, 10_3, \ldots 10_{n-3}, 10_{n-1}$ are shown as each receiving inputs from flip-flops for comparing an A operand of $n$ bits and a B operand of $n$ bits. For the relationship A equal to B, all the equal output signals are provided to one AND gate which is then utilized to provide the output indicating the equality relationship. For the other relationships, $j$ AND gates are used where $j$ is the number of two-bit modules (building blocks). For example, AND gate 200 is coupled to the most significant basic building block $10_1$. If the most significant pair of binary numbers indicates that the A operand is greater than the B operand, then the relationship between the other pairs of the numbers being compared is immaterial. As a result, a signal is provided from basic building block $10_1$ enabling AND gate 200 to provide a signal over conductor 210 to output terminal 208 thereby indicating the relationship that A is greater than B. Conversely, if all the most significant bit pairs between the two numbers are equal, and the least significant two bit pairs indicate that the A operand is greater than the B operand, then AND gate 204 is enabled. AND gate 204 has one output coupled to the basic building block $10_{n-1}$ which indicates the relationship of A greater than B. Its remaining inputs are coupled to the equality relationships from basic building blocks $10_1, 10_3, \ldots 10_{n-3}$. If all the inputs to AND gate 204 are enabled, then AND gate 204 provides a signal over conductor 210 to output terminal 208 thereby indicating the relationship.

Figure 6:
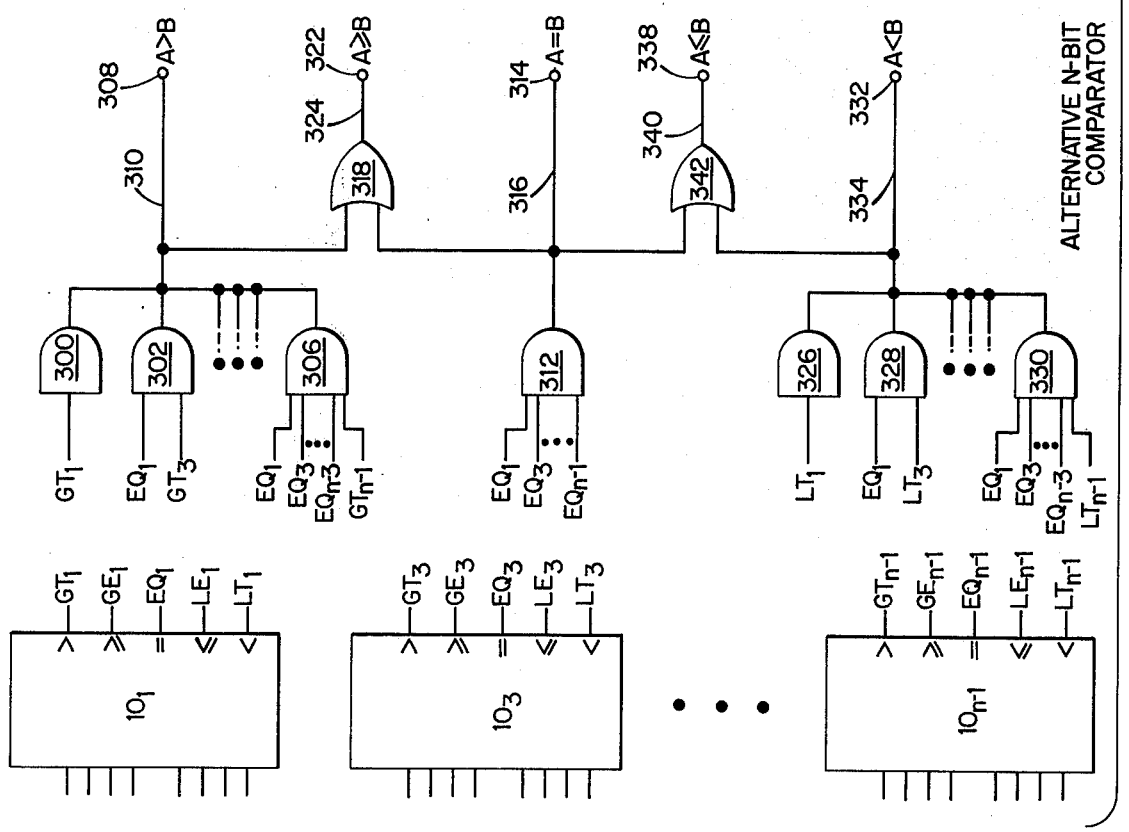
FIG. 6 is an alternative embodiment of an n-bit comparator.

In like manner, FIG. 6 shows the alternative embodiment for the situation wherein the A and B operands are of length $n$. The implementation for the relationship wherein A is greater than B utilizes AND gates 300 to 306 each having one input to the "greater than" output from each of the basic building blocks in ascending order. For AND gates other than that associated with the most significant pair, the equality relationship for the immediately higher pair is also coupled. Thus, AND gate 300 is coupled to the output of basic building block $10_1$ which provides the comparison between the most significant two orders of the A and B binary numbers. If the greater than relationship exists, AND gate 300 is enabled thereby providing an output signal over conductor 310 to output terminal 308. If the most significant pair are equal, and the next most significant pair are such that the A operand is greater than the B operand, then AND gate 302 is enabled and provides a signal over conductor 310 to output terminal 308. AND gate 306 is also shown which provides a signal when the least most significant pair of binary orders have a relationship wherein A is greater than B and the previous orders all have the relationship wherein the operands are equal. If this situation occurs, then AND gate 306 is enabled and provides a signal over conductor 310 to output terminal 308.

As was explained when describing FIG. 4, the relationship "A greater than or equal to B" or "A less than or equal to B" is derived from two other output signals. Thus, when there is an output signal provided over conductor 310, this signal enables OR gate 318 which provides a signal to output terminal 322 over conductor 324 thereby indicating the relationship that A is greater than or equal to B.

In like manner, AND gate 312 identifies the equality relationships wherein all the orders of binary numbers being compared are equal. If this situation occurs, then AND gate 312 is enabled thereby providing a signal to output terminal 314 over conductor 316. In addition, if this relationship exists, then OR gate 318 is enabled thereby providing a signal to output terminal 322 via conductor 324 indicating the relationship "A is greater than or equal to B" also co-exists.

A similar situation exists for the "less than" relationship which senses the outputs from the basic building blocks via AND gates 326 to 330 and provides a signal to output terminal 322 via conductor 334. When a signal is provided to output terminal 332, the relationship "A less than B" is known. If a signal has been provided over conductor 334, this also enables OR gate 342 to provide a signal to output terminal 338 via conductor 340 thereby indicating the relationship that A is less than or equal to B. Similarly, if a signal has been provided over conductor 316, then OR gate 342 is enabled thereby providing a signal to output terminal 338 via conductor 340, indicating that A is less than or equal to B.

It is noted that by the circuit utilized in FIG. 6 fewer gates are required as the size of the binary numbers increases. However, this is accomplished at the expense of introducing an additional time delay. Each of the embodiments, i.e., the preferred alternative embodiments, provide for the use of the basic building blocks in order to obtain the binary comparison result. These basic building blocks are two-bit comparator modules which are standardized thereby providing for greater reliability in their operation. Moreover, since the basic building blocks have been standardized in modular form, it is easier to identify erroneously operating circuitry so that fast and efficient corrections may be made.

Figure 7:
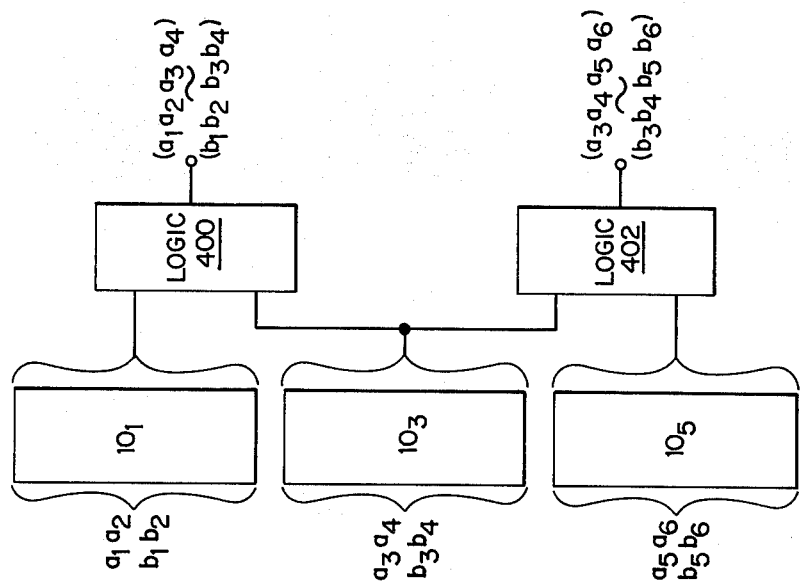
FIG. 7 is a block diagram showing the shareability of the two-bit comparator modules.

In FIG. 7, the modularity of the basic building blocks is utilized to show how the comparators may be shared so as to reduce the overall circuitry required. For example, in address development, it may be necessary to compare addresses in order to determine the proper group address. Subsequently, further information in the address may be required in order to perform a comparison to determine the proper address block. By the circuitry shown in FIG. 7, the same logic is utilized for both these operations. Thus, if the two-bit comparator had not been modularized, it would have been necessary to repeat the same logic construction and configuration, thus requiring extra circuitry.

In FIG. 7, an A operand is shown having six orders, $A_1$ to $A_6$, and a B operand having six orders, $B_1$ to $B_6$. Basic building blocks $10_1$ and $10_3$ compare $A_1$ to $A_4$ with $B_1$ to $B_4$. Basic building blocks $10_3$ and $10_5$ compare $A_3$ to $A_6$ with $B_3$ to $B_6$. As is evident, basic building block $10_3$ is being shared by both comparators. The logic shown as connected to the basic building blocks and indicated by reference numerals 400 and 402 is identical to that shown in FIGS. 3 to 6.

The above-described comparator also has applicability when the operands have different numbers of bits. In this situation, the input taken from the registers will be binary zeroed in sufficient high order positions to make the operands equal and even-numbered. For example, if the A operand were 5 bits and the B operand were 4 bits, then the A operand would be extended to six positions and the most significant digit of the A operand would be set to zero. Concurrently, the B operand would also be extended to the sixth order by adding binary ZEROS in the two most significant positions. The comparison between the two numbers would then be made.

While the principles of the invention have now been made clear in the illustrated embodiment shown above, there will be obvious to those skilled in the art many modifications in structure, arrangement and components used in the practice of the invention without departing from the above enunciated principles. For example, the AND gates may be converted to NAND or exclusive OR gates as is well known in the art with corresponding changes in the connecting circuitry. Additionally, the utilization of any three given inputs will provide the logic necessary in order to develop the five relationships described above. The appended claims are therefore intended to cover and embrace any such modification within the limits only of the true spirit and scope of the invention.

I claim:

1. A binary comparator for determining a plurality of relationships between a first and a second binary number, each of said binary numbers having two bits, said comparator comprising:

first comparing means having a plurality of inputs from bits of said first binary number and a corresponding plurality of inputs from complements of bits of said second binary number, said first comparing means providing a first signal indicating a first relationship between said binary numbers;

second comparing means having a plurality of inputs from bits of said second binary number and a corresponding plurality of inputs from complements of bits of said first binary number, said second comparing means providing a second signal indicating a second relationship between said binary numbers;

third comparing means having a plurality of inputs from bits of said first and said second numbers and from complements of bits of said first and said second numbers providing an intermediate signal, said third comparing means further having first inverting means responsive to said intermediate signal providing a third signal indicating a third relationship between said binary numbers; and output means coupled to each of said comparing means for transferring each of said indicating signals.

2. A two-bit comparator as defined in claim 1 wherein said first comparing means includes a first plurality of AND gates including:

a first AND gate having one input from said first binary number and two inputs from the complements of one of the bits of said secondary binary number;

a second AND gate having two inputs from said first binary number and one input from the complement of one of the bits of said second binary number; and a third AND gate having one input from the most significant order of said first binary number and a second input from the complement of the most significant order of said second binary number.

3. A two-bit binary comparator as defined in claim 2 wherein one input to said first AND gate is the least significant order of said first binary number and wherein one input to said second AND gate is the complement of the least significant order of said second binary number.

4. A two-bit binary comparator as defined in claim 3 wherein said second comparing means includes a second plurality of AND gates and wherein the inputs to said first plurality of AND gates are complementary to the inputs of said second plurality of AND gates with respect to said first and said second binary numbers.

5. A two-bit binary comparator as defined in claim 4 and further including:
second inverting means responsive to said first signal for providing a fourth signal indicating a fourth relationship between said binary numbers, and
third inverting means responsive to said second signal for providing a fifth signal indicating a fifth relationship between said binary numbers.

6. A two-bit binary comparator as defined in claim 5 wherein said first, second and third inverting means provide a second level of circuitry whereby the signals from said inverting means are provided simultaneously, said third, fourth and fifth signals occurring at a later time than said first and second signals.

7. A two-bit binary comparator as defined in claim 5 wherein:
said first signal identifies said first binary number as being greater than said second binary number;
said second signal identifies said first binary number as being less than said second binary number;
said third signal identifies said first binary number as being equal to said second binary number;
said fourth signal identifies said first binary number as being less than or equal to said second binary number; and
said fifth signal identifies said first binary number as being greater than or equal to said second binary number.

8. A two-bit binary comparator for determining a plurality of relationships between a first and a second binary number, each number having two bits, said comparator comprising:
first comparing means having a plurality of inputs from bits of said first binary number and a corresponding plurality of inputs from complements of bits of said second binary number, said first comparing means providing a first signal indicating a first relationship between said binary numbers;
second comparing means having a plurality of inputs from bits of said second binary number and a corresponding plurality of inputs from complements of bits of said first binary number, said second comparing means providing a second signal indicating a second relationship between said binary numbers;
third comparing means having a logical NAND gate coupled to receive said first signal and said second signal for providing a third signal indicating a third relationship between said binary numbers; and
output means coupled to each of said comparing means for transferring each of said indicating signals.

9. A two-bit binary comparator as recited in claim 8 wherein said first comparing means includes a first plurality of AND gates comprising:
a first AND gate having one input from said first binary number and two inputs from the complements of bits of said second binary number;
a second AND gate having two inputs from said first binary number and one input from the complement of one of the bits of said second binary number; and
a third AND gate having one input from the most significant order of said first binary number and a second input from the complement of the most significant order of said second binary number.

10. The two-bit binary comparator as recited in claim 9 wherein one input to said first AND gate is the least significant order of said first binary number and wherein one input to said second AND gate is the complement of the least significant order of said second binary number.

11. A two-bit binary comparator as recited in claim 10 wherein said second comparing means includes a second plurality of AND gates and wherein the inputs to said first plurality of AND gates are complementary to the inputs to said second plurality of AND gates with respect to said first and said second binary numbers.

12. A two-bit binary comparator as defined in claim 11 further comprising:
first inverting means responsive to said first signal for providing a fourth signal indicating a fourth relationship between said binary numbers; and
second inverting means responsive to said second signal for providing a fifth signal indicating a fifth relationship between said binary numbers.

13. A two-bit binary comparator as defined in claim 12 wherein:
said first signal identifies said first binary number as being greater than said second binary number;
said second signal identifies said first binary number as being less than said second binary number;
said third signal identifies said first binary number as being equal to said second binary number;
said fourth signal identifies said first binary number as being less than or equal to said second binary numbers; and
said fifth signal identifies said first binary number as being greater than or equal to said second binary number.

14. A two-bit binary comparator circuit for determining one of five relationships between a first and a second binary number, each number having two bits, said comparator comprising:
first comparing means including:
a first AND gate having as inputs the least significant order of said first binary number and the complements of the most and least significant orders of said second binary number;
a second AND gate having as inputs the most and the least significant order of said first binary number and the complement of the least significant order of said second binary number; and
a third AND gate having as inputs the most significant order of said first binary number and the complement of the most significant order of said second binary number;
said first comparing means providing a first signal indicating the relationship that said first binary number is greater than said second binary number;

second comparing means including:
- a first AND gate having as inputs the least significant order of said second binary number and complements of the most and least significant orders of said first binary number;
- a second AND gate having as inputs the most and least significant orders of said second binary number and the complement of the least significant order of said first binary number; and
- a third AND gate having as inputs the most significant order of said second binary number and the complement of the most significant order of said first binary number;

said second comparing means providing a signal indicating the relationship that said first binary number is less than said second binary number;

third comparing means including:
- a first AND gate having as inputs the most significant order of said first binary number and the complement of the most significant order of said second binary number;
- a second AND gate having as inputs the complement of the most significant order of said first binary number and the most significant order of said second binary number;
- a third AND gate having as inputs the least significant order of said first binary number and the complement of the least significant order of said second binary number; and
- a fourth AND gate having as inputs the complement of the least significant order of said first binary number and the least significant order of said second binary number;

said AND gates connected via an inverter to provide a third signal indicating the relationship that said first binary number is equal to said second binary number;

first inverting means responsive to said first signal for providing a fourth signal indicating the relationship that said first binary number is less than or equal to said second binary number;

second inverting means responsive to said second signal for providing a fifth signal indicating the relationship that said first binary number is greater than or equal to said second binary number; and output means coupled to each of said comparing means and inverting means for transferring each of said signals.

15. A binary comparator for determining a plurality of relationships between a pair of binary numbers, each of said pair having an ordered length of n-bits, where n is a positive integer, said comparator comprising:

first circuitry means including a plurality of comparator modules connected in parallel, each of said modules comparing like orders of two-bits from each of said pair of binary numbers, and providing a plurality of signals each corresponding to one of said plurality of relationships between said pair of binary numbers, and second circuitry means including a plurality of logic gates coupled to said modules, each gate coupled to receive a signal from at least one module for providing a set of output signals corresponding to the plurality of relationships between the pair of binary numbers.

16. An n-bit binary comparator as defined in claim 15 wherein said gates are organized into groups corresponding to each of said plurality of relationships between said numbers, said groups corresponding to the relationships wherein said first binary number is greater than said second binary number, said first binary number is greater than or equal to said second binary number, said first binary number is less than said second binary number, or said first binary number is less than or equal to said second binary number, each of said groups including:
- a first gate responsive to one output of the module corresponding to the most significant bits of the numbers being compared for providing an output signal indicating a relationship between said binary numbers corresponding to the relationship denoted by the signal from said module, and
- at least one additional gate having two inputs, one input from the module corresponding to the next most significant bits and a second input from the equality relationship of the corresponding to the most significant bits, said additional gate also providing an output signal indicating a relationship between said binary numbers corresponding to the group to which said gate belongs.

17. An n-bit comparator as defined in claim 16 wherein for the relationships wherein said first binary number is greater than said second binary number or said first binary number is less than said second binary number the number of said additional gates is $j-1$ where $j$ is the number of modules, each of said additional gates having one input from a module signal corresponding to the same relationship its own output signal identifies, and remaining inputs from the equality relationship of each higher order module.

18. An n-bit binary comparator as defined in claim 15 wherein the relationships are greater than, less than, equal to, greater than or equal to, or less than or equal to.

19. An n-bit binary comparator as defined in claim 15 wherein said binary numbers, if unequal in ordered length, are made equal by adding to the smaller ordered length number binary zeros in its high ordered digits.

20. An n-bit binary comparator as defined in claim 19 wherein said larger binary number if not having an even number of bits is provided with a binary zero in its highest order.

21. An n-bit binary comparator as defined in claim 15 wherein said modules are usable for parts of said binary numbers.

22. An n-bit binary comparator as recited in claim 15 wherein said second level of circuitry provides only three output signals and further comprising a third level of circuitry including a plurality of gates coupled to outputs of said second level of circuitry for providing signals corresponding to the remaining two relationships between said two binary numbers.

23. An n-bit binary comparator as recited in claim 22 wherein said second level of circuitry provides signals corresponding to the relationships greater than, equal to, and less than, and wherein said third level of circuitry provides signals corresponding to the relationships greater than or equal to, and less than or equal to.

* * * * *